R. R. HATTON.
RESILIENT WHEEL.
APPLICATION FILED JAN. 29, 1916.
1,315,491. Patented Sept. 9, 1919.
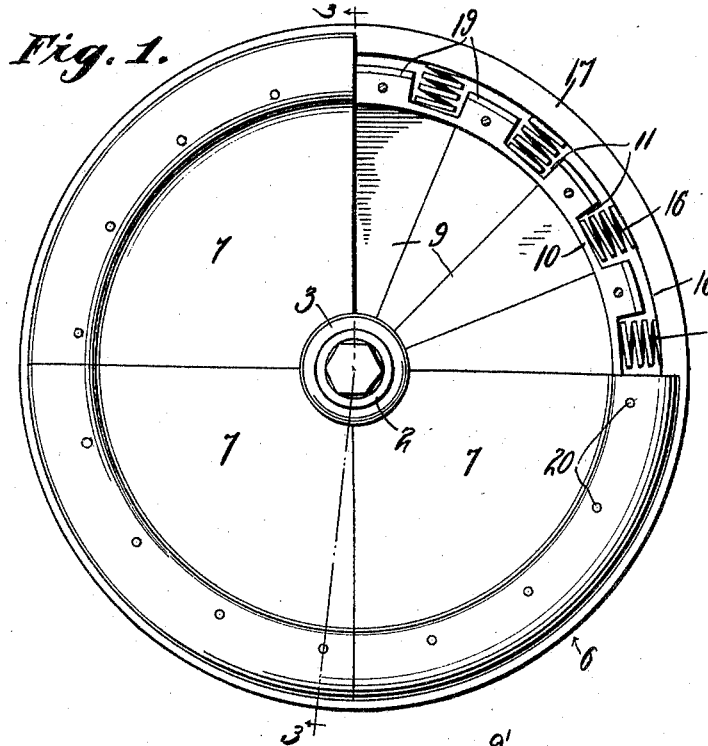
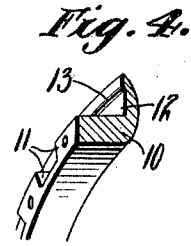
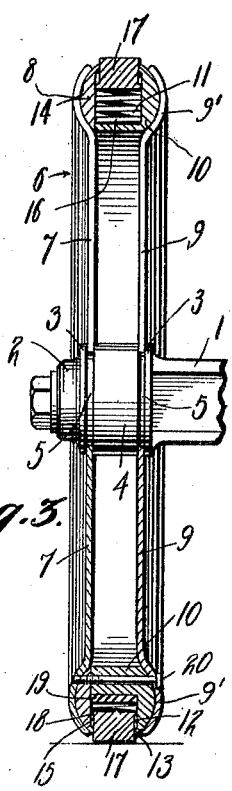
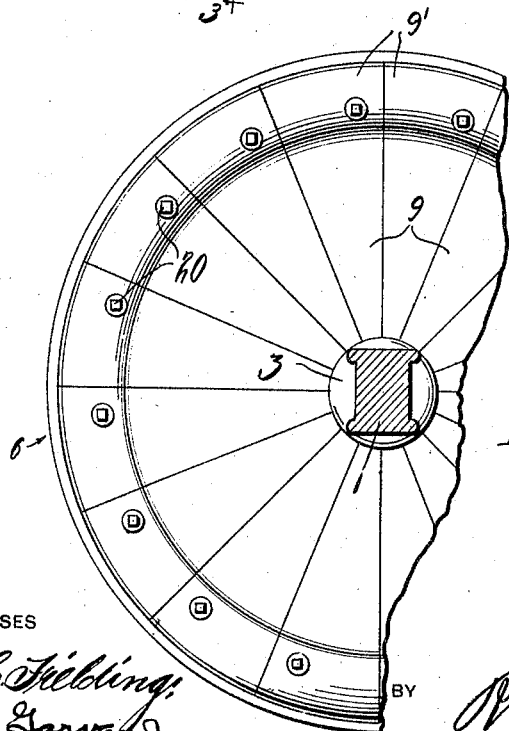
WITNESSES
INVENTOR
Rudolph R. Hatton
BY
ATTORNEY

UNITED STATES PATENT OFFICE.

RUDOLPH R. HATTON, OF NEW YORK, N. Y.

RESILIENT WHEEL.

1,315,491.  Specification of Letters Patent.  Patented Sept. 9, 1919.

Application filed January 29, 1916. Serial No. 75,137.

*To all whom it may concern:*

Be it known that I, RUDOLPH R. HATTON, a citizen of the United States, residing at New York, in the county of Bronx and State of New York, have invented certain new and useful Improvements in Resilient Wheels, of which the following is a specification.

This invention relates to resilient wheels having primarily for its object to substitute a suitable resiliencing medium for the well known expensive pneumatic tire now in use, without materially diminishing the resilience afforded by the pneumatic tire.

Another object is to provide a durable and generally efficient structure which may be readily associated with any type of vehicle.

Other objects as well as the nature, characteristic features and scope of my invention will be more readily understood from the following description taken in connection with the accompanying drawings and pointed out in the claim forming a part of this specification.

Referring to the drawings:

Figure 1 is a side elevational view of a resilient wheel constructed in accordance with my invention a portion thereof being removed to disclose details, Fig. 2 is a side elevational view of the wheel looking from the vehicle side thereof, and illustrating the application of the same to a vehicle axle, the latter being shown in section, Fig. 3 is a cross sectional view taken on the line 3—3 of Fig. 1 and looking in the direction of the arrows and Fig. 4 is a detail enlarged perspective fragmentary view of the felly used in this invention.

In the drawings:

In order to illustrate the application of this invention a portion of an axle 1 has been shown which may be of the usual or any desired configuration.

Mounted upon the axle 1 is a hub 2, the latter being equipped with annular flanges 3, and having mounted on the outer periphery thereof, midway between said flanges, an annulus 4, whereby grooves 5 are provided between said flanges 3 and the annulus 4.

Mounted upon the hub 2 is a casing, generally designated 6 which in this instance comprises oppositely disposed spaced side members the outer of which comprises four distinct independent segments 7, one of which has been shown removed in Fig. 1. The segments 7 are identical in configuration, each comprising a plate which has its apex arcuated and engaged with the outer of the grooves 5 in the hub 2. Each of said plates is pressed outwardly in proximity to its outer margin, to provide a segmental recess 8, whereby when all of said sections are engaged, a circumferential recess is provided. The inner side of the casing comprises a multiplicity of segments 9, the apex of each of which is engaged with the inner of the grooves 5 while the outer end of each is pressed outwardly as indicated at 9' to provide an arcuate recess, whereby when said segments 9 are assembled, a circumferential recess will be provided which will oppose the circumferential recess provided when the segments 7 are assembled.

Mounted in the circumferential recess of the casing 6 is a felly 10 which is made of wood, metal or any other suitable material and comprises a structure substantially L-shaped in section, the outer face of the base of which has portions thereof removed at equi-distant intervals to provide recesses 11. The outer side face of the arm of said L-shaped felly is of an arcuate configuration to conform to the contour of the circumferential recess formed by assembling the segments 9, while the inner face of said arm is provided with a circular recess or groove 12, this construction thereby providing a shoulder 13. The ring member 14 goes to make up the remainder of the felly 10, the outer side face of which is arcuate to conform to the shape of the circumferential recess formed by assembling the segments 7, while the opposite face is recessed or grooved as indicated at 15 and alined with the groove 12.

Mounted in each of the recesses 11 is an elastic element 16 which in this instance comprises a coil spring, the innermost convolution of which is engaged with the face of the L-shaped portion of the felly 10, while the outermost convolution is engaged with the inner periphery of the tread 17. The inner periphery of said tread 17 is equipped with laterally extending portions 18 to provide abutments for contact with the shoulder 13 of the felly 10 in order to limit the outward movement of said tread and prevent casual displacement of the tread from the felly.

Resilient blocks 19 are mounted upon the outer periphery of the base of the felly 10, hereby should undue pressure be exerted upon the tread 17, shock will be absorbed from the latter to prevent distortion of the tread member and preventing undue jarring of the vehicle.

As illustrated to advantage in Fig. 3, bolts 20 are detachably mounted at intervals through the depressed portion adjacent the outer periphery of the casing 6, and through alining recesses in the base of the felly 10, as well as the ring member 14. It is therefore seen that any of the segments 7 or 9 may be readily removed should it be rendered unsuitable for use, or if it is desired to gain access to the interior of the casing.

It will be understood that the above description and accompanying drawings comprehend only the general and preferred embodiment of my invention and that various minor changes in details of construction, proportion and arrangement of parts may be made within the scope of the appended claim without sacrificing any of the advantages of my invention.

I claim:—

A wheel having a tread member provided with lateral projections, a retainer member for the tread member having side walls provided with interiorly extending projections overlapping and normally spaced from said projections, a base carried by one of said side walls, plate members on opposite sides of said side walls, one of said plate members having a groove adjacent the periphery and one of said walls extending into said groove, said base member alternately having blocks and recesses, cushioning means in said recesses engaging the base and the tread, fastening means extending through said plates, said side wall and said block, and auxiliary cushioning means on said blocks and normally spaced from the tread.

In testimony whereof I affix my signature in presence of two witnesses.

RUDOLPH R. HATTON.

Witnesses:
BENJAMIN B. HATTON,
ABRAHAM MATLIN.

Copies of this patent may be obtained for five cents each, by addressing the "Commissioner of Patents, Washington, D. C."